United States Patent [19]
Choi

[11] Patent Number: 6,124,681
[45] Date of Patent: Sep. 26, 2000

[54] ELECTRONIC BALLAST FOR HIGH-INTENSITY DISCHARGE LAMP

[75] Inventor: Hyun Bae Choi, Chungcheongnam-Do, Rep. of Korea

[73] Assignee: T & B Tronics Co., Ltd., Chungcheongnam-Do, Rep. of Korea

[21] Appl. No.: 09/289,717

[22] Filed: Apr. 12, 1999

[30] Foreign Application Priority Data

Mar. 9, 1999 [KR] Rep. of Korea ...................... 99-7777

[51] Int. Cl.[7] ...................................................... G05F 1/00
[52] U.S. Cl. ........................... 315/291; 363/37; 315/247
[58] Field of Search ................................... 315/291, 206, 315/209 R, 212, 224, 226, 247, 276, 277, 307, DIG. 2, DIG. 5, DIG. 7; 363/37, 89, 171; 323/358, 901

[56] References Cited

U.S. PATENT DOCUMENTS

| | | | |
|---|---|---|---|
| 4,277,728 | 7/1981 | Stevens | 315/291 |
| 4,506,195 | 3/1985 | Elms | 315/247 |
| 5,192,897 | 3/1993 | Vossough et al. | 315/DIG. 5 |
| 5,225,742 | 7/1993 | Beasley | 315/DIG. 7 |
| 5,442,261 | 8/1995 | Bank et al. | 315/307 |
| 5,515,261 | 5/1996 | Bogdan | 363/89 |
| 5,677,602 | 10/1997 | Paul et al. | 315/224 |
| 5,900,701 | 5/1999 | Guhilot et al. | 315/307 |
| 5,986,901 | 11/1999 | Weng | 363/37 |

*Primary Examiner*—Don Wong
*Assistant Examiner*—Thuy Vinh Tran
*Attorney, Agent, or Firm*—Nixon Peabody LLP; Thomas W. Cole

[57] ABSTRACT

Disclosed is an electronic ballast for a HID lamp of a high wattage. A conventional AC voltage is filtered for rejecting a noise and is full-wave rectified. The rectified voltage is provided to a power-factor correction circuit. The power-factor correction circuit produces a boosted DC voltage with a high power-factor by charging capacitors while the rectified voltage transferred by a transformer is switched in a high frequency by a MOSFET. A high-frequency driving circuit produces a charge voltage with the boosted DC voltage, flows a discharge current by alternately switching in a high-frequency two switching circuits which use bipolar transistors coupled in a half-bridge type to discharge the charge voltage, and provides a driving power to the HID lamp while generating a resonance with an energy transferred by the discharge current. In order to drive a HID lamp of a high rating power, the switching circuits further includes transformers which enhance base currents of the bipolar transistors, respectively. To drop an operation temperature of the ballast circuit, a plurality of transformers providing a driving power to the HID lamp are arranged in parallel.

12 Claims, 7 Drawing Sheets

ELECTRONIC BALLAST FOR HIGH-INTENSITY DISCHARGE LAMP

BACKGROUND OF THE INVENTION

1. Field of the Invention

The present invention relates in general to an electronic ballast for a high-intensity discharge (HID) lamp and, more particularly, to an electronic ballast for the HID lamp of a high wattage.

2. Description of the Prior Art

The HID lamp such as a sodium (natrium) vapor lamp, a mercury lamp, a metal halide lamp and the like needs a restart time in its characteristic. A prior typical magnetic ballast for a discharge lamp continuously tries a start operation until the lamp is relighted. Since the magnetic ballast is made of a coil and an iron core, the coil and the iron core seldom have a damage during the relight of the lamp.

In an electronic ballast, however, if a trial to start the discharge lamp is continued till a light-on of the discharge lamp, devices such as semiconductor devices of the electronic ballast may be damaged, which may result in a breakdown of the electronic ballast. In order to avoid the damage, the electronic ballast has in general a time delay circuit so as to adjust a relight time of the discharge lamp.

Meanwhile, since a high voltage should be applied in order to drive the HID lamp of the high wattage, a secondary voltage higher than a conventional voltage should be made. Besides, it is inevitable to flow a large amount of current into a switching device of the electronic ballast because the HID lamp of the high wattage needs a large lamp current. Furthermore, as a load generates a high voltage, the semiconductor switching device should have a high withstand voltage and a high rating current. As for now, a bipolar transistor and a metal-on-silicon field effect transistor (MOSFET) can meet the above requirement and thus they have been used as a switching device.

The bipolar transistor with the high withstand voltage and the high rating current has a low amplification factor so that a conventional base driving circuit can drive a HID lamp of a low wattage but can not drive the HID lamp of the high wattage. So, most electronic ballast circuits for the HID lamp of the high wattage uses the MOSFET rather than the bipolar transistor. But, the MOSFET device is capable of supplying a driving power about 200 watts at most, thus it can be said that the MOSFET is not available for the HID lamp of the high wattage, for example, 400 watts.

Meanwhile, the bipolar transistor has higher withstand voltage and allowable current than the MOSFET so that the bipolar transistor has an advantage in a large current drive. Accordingly, in order to drive the HID lamp of the high wattage, the bipolar transistor has to be employed as the switching device.

SUMMARY OF THE INVENTION

Therefore, it is an object of the present invention to provide an electronic ballast circuit capable of driving the HID lamp of the high wattage by using the bipolar transistor as the switching device and by enhancing a base current of the bipolar transistor.

It is another object of the present invention to provide the electronic ballast circuit, without addition of a particular circuit for preventing devices of the electronic ballast circuit from being damaged, having a capability of a device protection upon the relight of the HID lamp by suitably adjusting parameter values of auxiliary devices of an integrated circuit for a power-factor correction and a voltage boost.

Furthermore, it is a third object of the present invention to provide the electronic ballast capable of resolving a problem of a temperature rise owing to a heat generation upon driving the HID lamp with a high wattage by employing a plurality of transformers for driving the HID lamp and by arranging the transformers in parallel to distribute the heat generation.

In order to achieve the above-mentioned objects, the present invention provides an electronic ballast for the HID lamp of the high wattage. The electronic ballast comprises a power source converting circuit for producing a rectified voltage by rectifying a conventional alternating current (AC) voltage, for providing a start voltage by transforming the rectified voltage, and for converting the rectified voltage into a boosted direct current (DC) voltage whose level is higher than a peak of the rectified voltage and which has a corrected high power-factor by high-frequency switching the rectified voltage; and a high-frequency driving circuit, initiating an operation thereof by the start voltage, for producing a charge voltage by using the boosted DC voltage, for flowing a discharge current due to the charge voltage by alternately executing a high-frequency switching operation, and for providing a driving power to the HID lamp while generating a resonance with an energy transferred by the discharge current.

The power source converting circuit comprises a rectifying circuit for producing the rectified voltage by rectifying the conventional AC voltage, and a power-factor correction circuit for charging a capacitor by providing the rectified voltage supplied from the rectifying circuit to the capacitor through a coil, and for charging the capacitor with a stored energy of the coil by a high-frequency switching operation of a switching device arranged between the coil and the capacitor during the rectifying circuit does not provide the rectified voltage to the high-frequency driving circuit directly, so that the capacitor continuously provides the boosted DC voltage to the high-frequency driving circuit to obtain the corrected high power-factor.

The high-frequency driving circuit comprises a charging section for producing the charge voltage by using the boosted DC voltage; a half-bridge switching section for flowing the discharge current by discharging the charge voltage in a way of half-bridge through a pair of switching devices which are alternately executing the high-frequency switching operation and for enhancing amounts of currents flowing through the pair of the switching devices by transformers provided to each of the switching devices, whereby an amount of the discharge current increases; and a lamp driving section for providing the driving power to the HID lamp while generating the resonance with the energy transferred by the discharge current.

The charging section includes first and second capacitors which are connected serially with each other and have an identical capacitance. The half-bridge section comprises first and second switching sections and a first transformer section connected between the first switching section and the second switching section for providing base driving currents to both first and second switching sections by means of a mutual induction; wherein the first switching section comprises a first bipolar transistor with a grounded emitter that includes a first free-whirling path and provides a discharging path for the first capacitor when the first bipolar transistor is turned on, a start capacitor for charging the start voltage, a DIAC for providing a charge voltage of the start capacitor as a base current of the first bipolar transistor so as to initially turn on the first bipolar transistor, and a second transformer section connected between a collector and a base of the first bipolar transistor for enhancing the base driving current of the first bipolar transistor based on a variation of a collector current of the first bipolar transistor; and wherein the second switching section comprises a second bipolar transistor with a collector connected to the second capacitor that includes a second free-whirling path and provides a discharging path for the second capacitor when the second bipolar transistor is turned on, and a third transformer section connected between an emitter and a base of the second bipolar transistor for enhancing the base driving current of the second bipolar transistor based on a variation of an emitter current of the second bipolar transistor. The first transformer section includes a plurality of transformers having a parallel connection with each other. It is preferable that the high-frequency driving circuit further comprises a filter section for selecting a fundamental frequency component from the discharge current which flows through the half-bridge switching section so as to provide the selected fundamental component to the lamp driving section.

The lamp driving section comprises a driving transformer section, connected between a connection of the first and second capacitors and the half-bridge switching section, for transforming the discharge current of the half-bridge switching section into a driving power for the HID lamp; a third capacitor, connected to the driving transformer section in parallel, for reducing an energy loss caused by an alternate polarity switching of an induction voltage of the driving transformer; and a fourth capacitor for limiting an over-current of the HID lamp. Here, the driving transformer section includes a plurality of transformers having a parallel connection with each other.

BRIEF DESCRIPTION OF THE DRAWINGS

The above objects and other advantages of the present invention will become more apparent by describing in detail preferred embodiments thereof with reference to the attached drawings, in which.

DESCRIPTION OF THE PREFERRED EMBODIMENT

Hereinafter, a preferred embodiment of the present invention will be explained in more detail with reference to the accompanying drawings.

Figure 1:
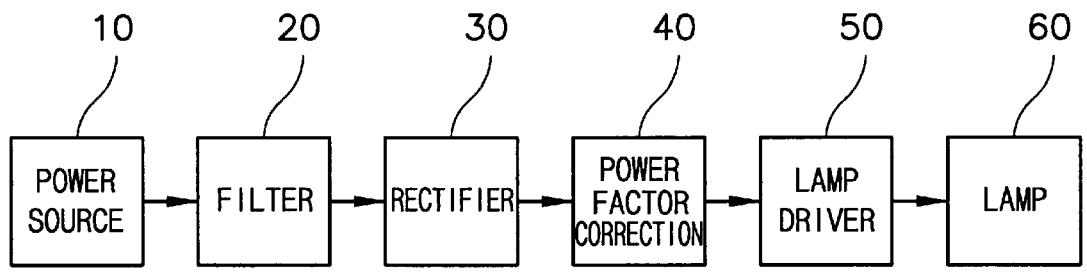
FIG. 1 is a schematic block diagram showing a whole configuration of the electronic ballast for the HID lamp according to the present invention.

The ballast circuit for a HID lamp 60 according to the present invention, as shown in FIG. 1, has a power source input circuit 10, a filter circuit 20, a rectifier circuit 30, a power-factor correction circuit 40 and a lamp driver circuit 50.

Figure 2:
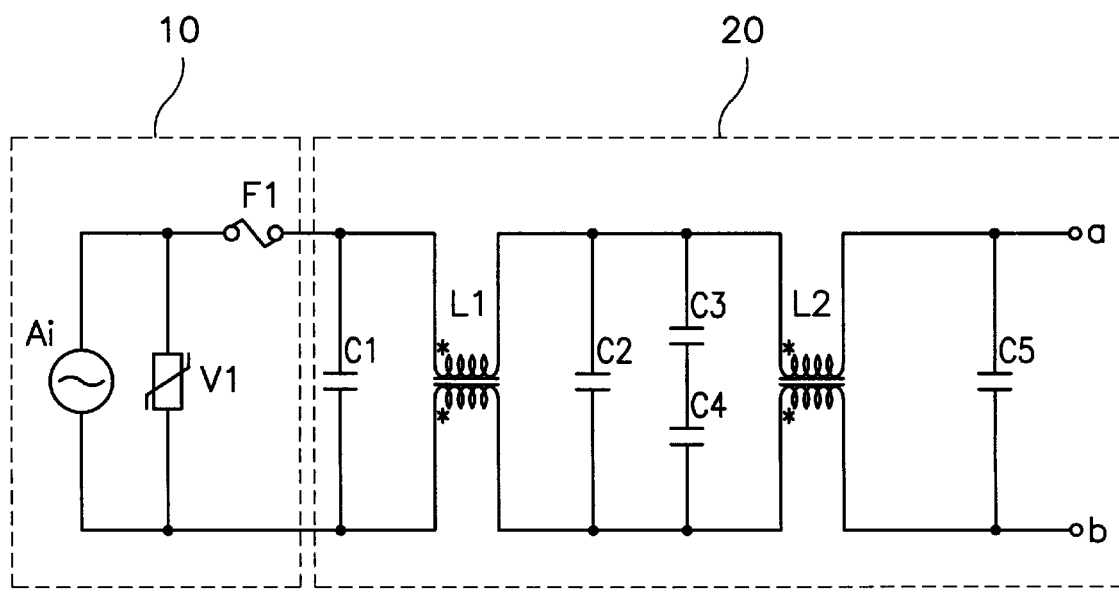
FIG. 2 is a detailed circuit of an embodiment of a power input circuit and a filter circuit.

FIG. 2 illustrates a configuration of the power source input circuit 10 and the filter circuit 20. The ballast circuit uses a conventional AC power source Ai as an input power source. The AC power source Ai is supplied to the filter circuit 20 through a varistor V1 and a fuse F1 for an over-voltage protection. The filter circuit 20 consists of capacitors C1, C2, C3, C4 and C5 and transformers L1 and L2 and functions as an electromagnetic wave elimination circuit which limits harmonic frequency components and a noise of the AC power source Ai.

Figure 3:
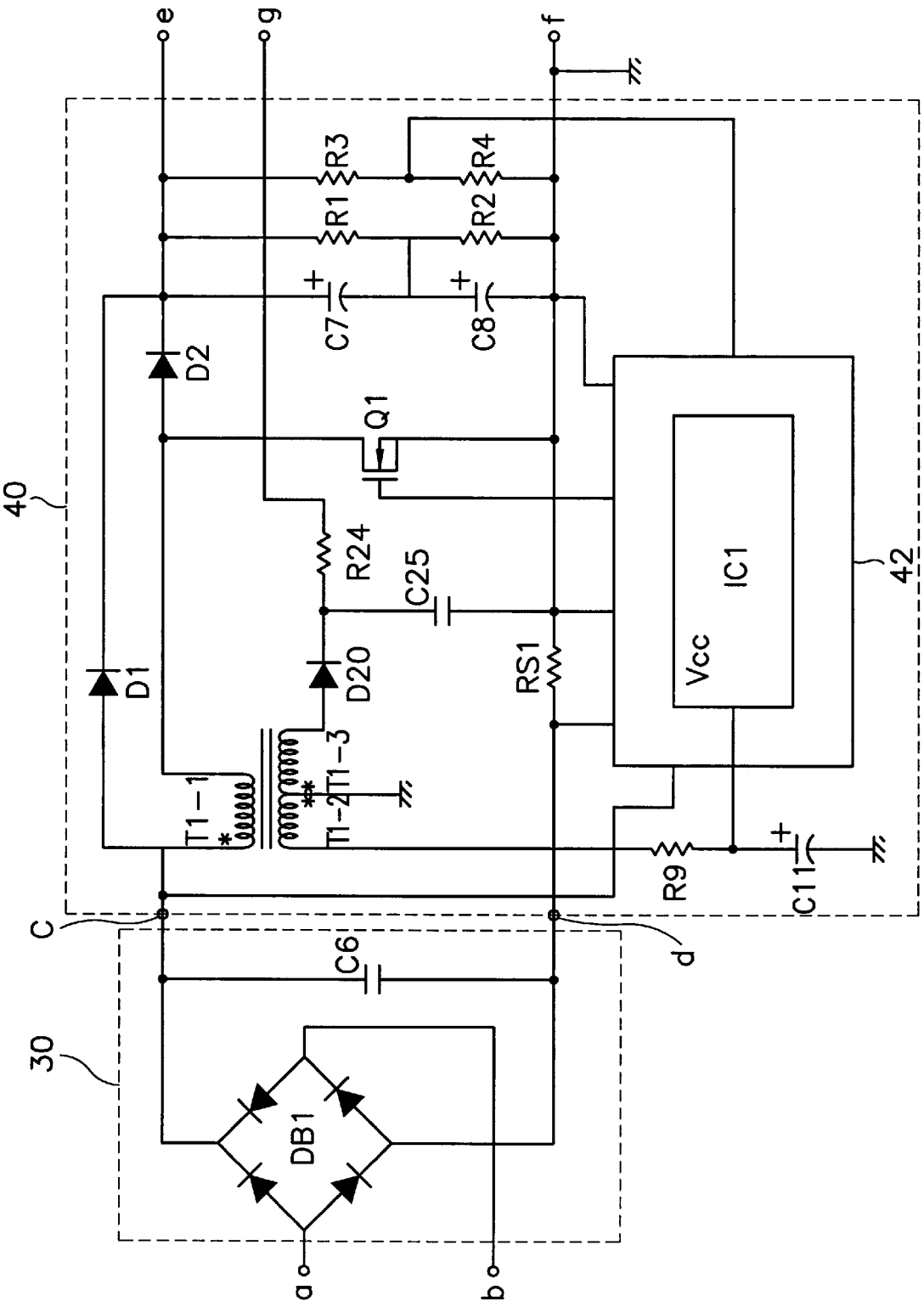
FIG. 3 is a detailed circuit of an embodiment of a rectifier circuit and a power-factor correction circuit.

A configuration of the rectifier circuit 30 and the power-factor correction circuit 40 is shown in FIG. 3. The rectifier circuit 30 includes a bridge circuit DB1 configured with four diodes and a charge capacitor C6 connected to an output terminal of the bridge circuit DB1 and rectifies the filtered AC power source in a way of full-wave rectification.

The power-factor correction circuit 40 has a transformer T1 having a primary coil winding T1-1 and two secondary coil windings T1-2 and T1-3 for transforming a rectified ripple voltage fed from the rectifier circuit 30. The power-factor correction circuit 40 further includes a booster type power-factor correction IC 42 which is connected to the secondary coil winding T1-2 of the transformer T1 through a resistor R9 and a capacitor C11, which are connected in serial with each other, so as to receive a source voltage Vcc. Two diodes D1 and D2 lie between the primary coil winding T1-1 and an output terminal e, respectively. Source and drain terminals of a MOSFET Q1 are connected between a connection of the diode D2 and the primary coil winding T1-1 and an output terminal f. Furthermore, capacitors C7 and C8 with a serial connection and resistors R3 and R4 with a serial connection are connected in parallel between the output terminals e and f. Resistors R1 and R2 are added in parallel to the capacitors C7 and C8, respectively. A Diode D20 and a resistor R24, serially connected with each other, lie between the secondary coil winding T1-3 and an output terminal g, and a capacitor C25 is arranged between the output terminal f and a connection of the Diode D20 and the resistor R24. A resistor RS1 is provided between an input terminal d and the output terminal f.

The power-factor correction IC 42 has a power-factor correction IC chip IC1 and an auxiliary circuit thereof. In the embodiment of the present invention, a booster type IC chip, product number UC3854, of UNITRODE INTEGRATED CIRCUITS CO., LTD. is used, for example, as the power-factor correction IC chip IC1.

Figure 4:
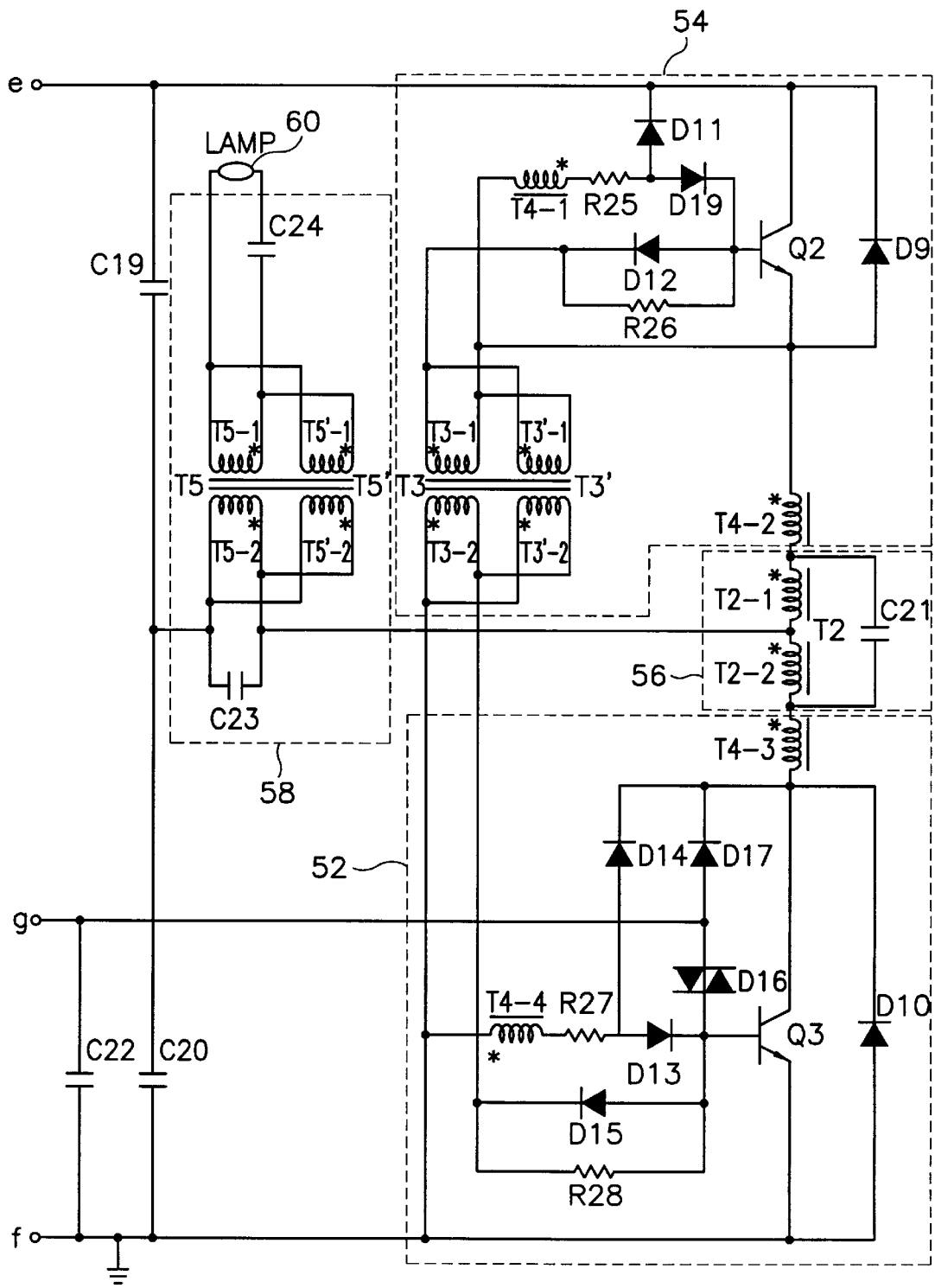
FIG. 4 is a detailed circuit of a, embodiment of a high-frequency lamp driving circuit.

The lamp driver circuit 50, whose configuration is shown in FIG. 4, is a circuit for driving the HID lamp 60 by alternately supplying a high-frequency driving signal, which is obtained through the filter circuit 20, the rectifier circuit 30 and the power-factor correction circuit 40 in turn, to the HID lamp 60 by means of a high-frequency switching operation thereof to light on the HID lamp 60. In FIG. 4, the lamp driver circuit 50 includes a charging section consisting of capacitors C19, C20 and C22, a first switching section 52, a second switching section 54, a filter section 56 and a lamp driving section 58.

In detail, the capacitors C19 and C20, serially connected with each other, have an identical capacitance and are connected across the two output terminals e and f of the power-factor correction circuit 40. Another capacitor C22 is connected across the two output terminals g and f of the power-factor correction circuit 40.

The first switching section 52 consists of an NPN type bipolar transistor Q3, a diode D10 connected in parallel to the transistor Q3 with an opposite polarity to the transistor Q3, a DIAC D16 lies between a base of the transistor Q3 and the capacitor C22 and a first base driving circuit for controlling an amount of a base current of the transistor Q3. Here, the first base driving circuit has a configuration as follows. A secondary coil winding T3-2 of a transformer T3 and a current limiting resistor R28, which is serially connected to the secondary coil winding T3-2, are connected across a base and an emitter of the transistor Q3, and a diode D15 is added to the resistor R28 in parallel. A coil winding T4-3 of a transformer T4 is connected to a collector of the transistor Q3 and a coil winding T4-4 of the transformer T4 having a magnetic coupling with the coil winding T4-3 is connected across the emitter and the base of the transistor Q3. A current limiting resistor R27 and a diode D13 which are serially connected with each other come in between the coil winding T4-4 and the base of the transistor Q3. A coupling polarity of the two coil windings T4-3 and T4-4 of the transformer T4 is the same as shown in FIG. 4. A diode D14 is provided between the resistor R27 and the collector of the transistor Q3.

The second switching section 54 consists of an NPN type bipolar transistor Q2 having a connection with the output terminal e of the power-factor correction circuit 40 through a collector thereof, a diode D9 connected in parallel to the transistor Q2 with an opposite polarity to the transistor Q2, and a second base driving circuit for controlling an amount of a base current of the transistor Q2. The second base driving circuit has a configuration similar to that of the first base driving circuit. In the configuration of the second base driving circuit, a primary coil winding T3-1 of a transformer T3 and a current limiting resistor R26, which is serially connected to the primary coil winding T3-1, are connected across a base and an emitter of the transistor Q2, and a diode D12 is added in parallel to the resistor R26. A coil winding T4-2 of the transformer T4 is added to the emitter of the transistor Q2 and a coil winding T4-1 of the transformer T4 which has a magnetic coupling with the coil winding T4-2 is connected across the emitter and the base of the transistor Q2. A current limiting resistor R25 and a diode D19, which are serially connected with each other, are inserted between the coil winding T4-1 and the base of the transistor Q2. A coupling polarity of the two coil windings T4-1 and T4-2 of the transformer T4 is the same as shown in FIG. 4. A diode D11 is provided between the resistor R25 and the collector of the transistor Q2.

The filter section 56 is configured with a transformer T2 which lies between the two coil windings T4-2 and T4-3 and a capacitor C21. The transformer T2 and the capacitor C21 are connected in parallel with each other.

Meanwhile, the lamp driving section 58 has a capacitor C23 and a transformer T5 which are connected in parallel with each other between a connection of the capacitors C19 and C20 and a connection of the two coil windings T2-1 and T2-2 of the transformer T2, and a capacitor C24 which is inserted between the HID lamp 60 and the transformer T5.

Meanwhile, the two coil windings T3-1 and T3-2 of the transformer T3, which plays a role of transferring a driving power for the bases of the first and second switching sections 52 and 54, are magnetically coupled with such a coupling polarity as shown in FIG. 4. Though the transformer T3 can be configured only with the two coil windings, a rise in temperature due to a heat generation while the HID lamp 60 is driven in a high-wattage can give a damage to the transformer T3. So, to obviate the heat burden of the transformer T3, it is recommendable to add another transformer T3' to the transformer T3 in parallel. Likewise, it is preferable to add a transformer T5' to the transformer T5 of the lamp driving section 58 in parallel. From the addition of the transformer, a total load is distributed by half to each transformer so that a heat amount generated at one transformer can be conspicuously reduced. Furthermore, there is no reason to restrict a number of the added transformer to one and the number can be optimally determined by taking account of a load size, a transformer temperature and other things. Besides, the transformers T3 and T5 can be integrated into a single transformer.

In the ballast circuit of the present invention with such a configuration as above, two main concepts are worthy to be noted. The first concept is that for a protection of circuit devices upon relighting the lamp, the ballast circuit does not use a time delay circuit already known but use the booster type power-factor correction IC 42 which is suitable for the HID lamp with a high-wattage. The second concept is that the transformer T4 is added to the base driving circuits to magnify the base currents of the switching transistors Q2 and Q3 and thus to obtain large currents of the transistors Q2 and Q3, so that the HID lamp can be driven to output the high-wattage.

Detailed description as to operations of the electronic ballast according to the present invention is given below.

Figure 5A:
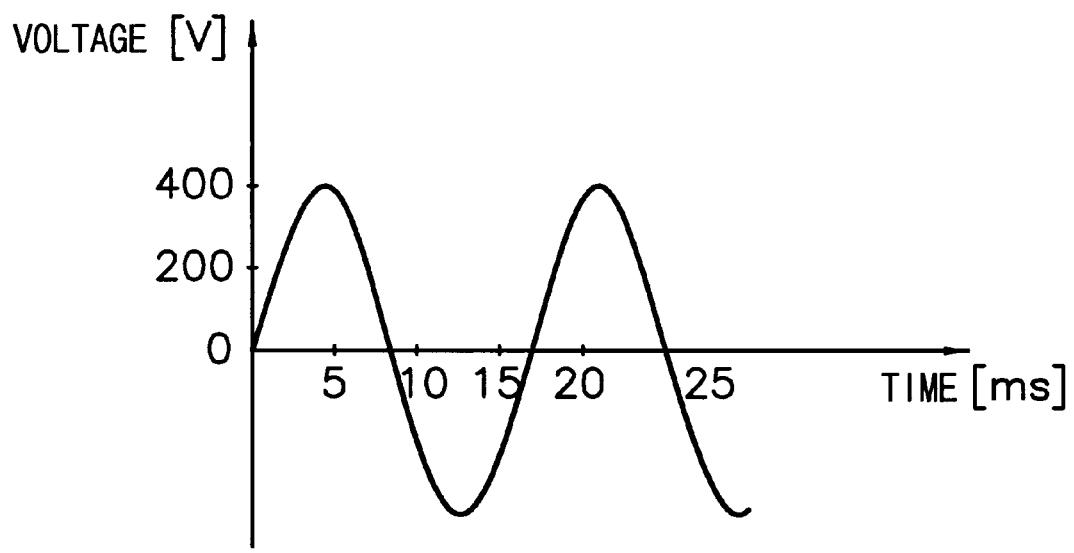
FIGS. 5A to 5H are waveforms of input/output signals detected from several points of the electronic ballast of the present invention.
Figure 5B:
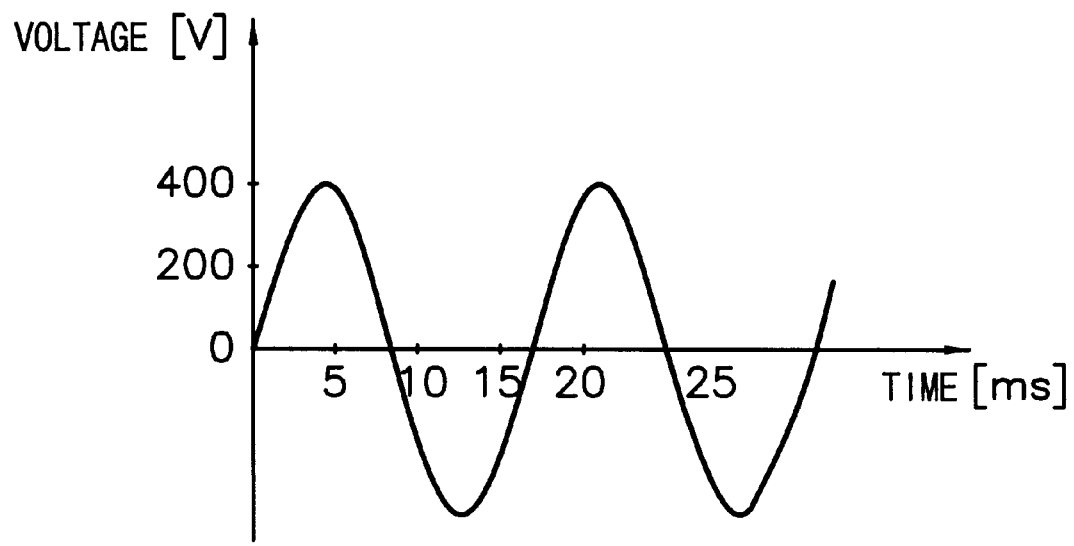

When the HID lamp 60 is lighted, harmonics and noises occur in the ballast circuit. The filter circuit 20 blocks out these lighting noises not to propagate to the power source input circuit 10. Besides, when an over-voltage is supplied from the power source input circuit 10, it is shut out by the fuse F1, and a noise component passing through the fuse F1 is eliminated by the filter circuit 20 not to enter into the ballast circuit. Namely, the filter circuit 20 ensures a stable operation of the ballast circuit by separating the AC power source Ai and the subsequent circuit sections of the filter circuit 20 in view of noise. FIG. 5A illustrates a voltage waveform of the AC power source Ai whose root-mean-square (RMS) value is, for example, about 280V, and FIG. 5B illustrates a waveform of an output of the filter circuit 20, where it can be known that the two waveforms are almost identical due to the noise rejection operation of the filter circuit 20.

Figure 5C:
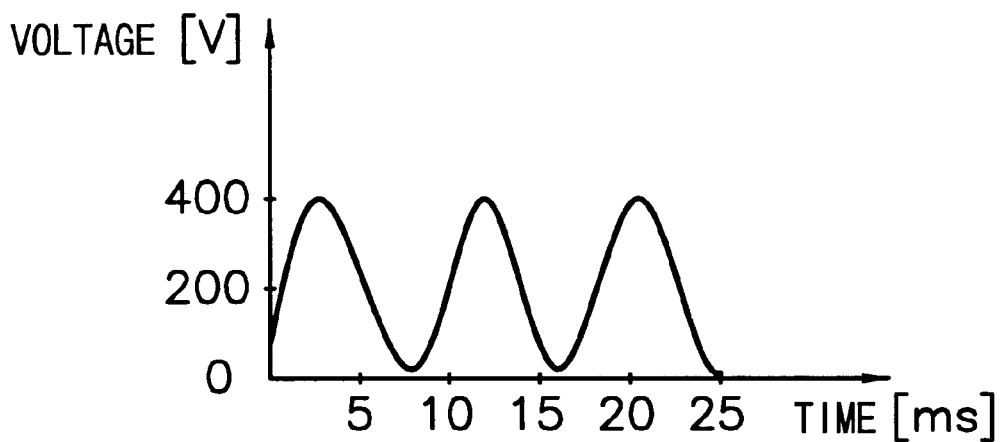

The AC power source Ai transferred through the filter circuit 20 is full-wave rectified into a ripple voltage by the rectifier circuit 30 and harmonic components of the full-wave rectified ripple voltage are absolved by the capacitor C6. FIG. 5C illustrates a waveform of the full-wave rectified voltage by the rectifier circuit 30 captured at an input terminal c of the power-factor correction circuit 40.

The rectified voltage from the rectifier 30 is fed into the transformer T1 of the power-factor correction circuit 40 and is level-downed. The electrolytic capacitor C11 is charged by the level-downed voltage supplied through the resistor R9. And, the power-factor correction IC chip IC1 receives the source voltage Vcc from the capacitor C11. When a charge voltage of the capacitor C11 exceeds a threshold level, that is, a driving voltage of the IC chip IC1, the power-factor correction IC chip IC1 begins its operation.

Figure 5D:
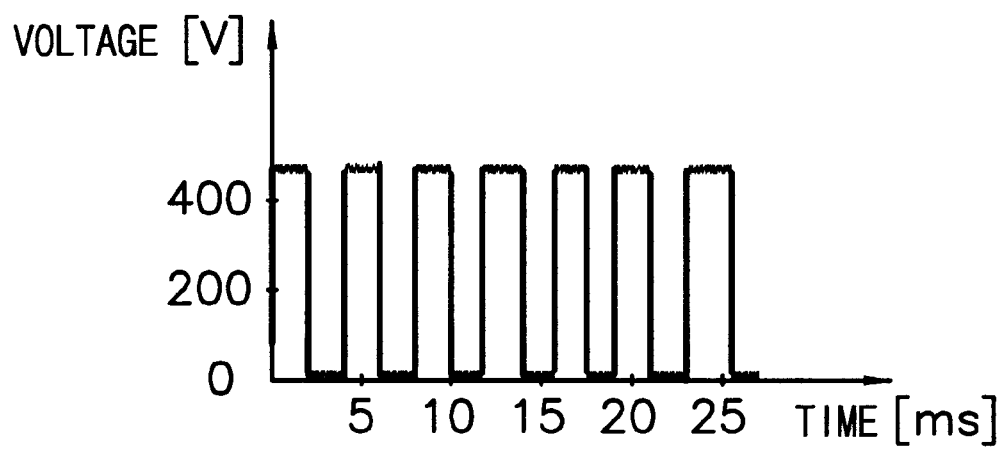

While the IC chip IC1 executing its operation, the IC chip IC1 provides a trigger signal to a gate of the MOSFET Q1 at a high frequency, and thereby the MOSFET Q1 oscillates in a high speed. With the high-frequency oscillation, the MOSFET Q1 produces a stream of square-wave, of which the amplitude is about 450V, and provides the square-wave to the capacitors C7 and C8. FIG. 5D illustrates a waveform of the square-wave developed across the source and drain of the MOSFET Q1. Consequently, the power-factor correction circuit 40 transforms the full-wave rectified voltage from the rectifier circuit 30 into a boosted DC voltage which is provided to the lamp driver circuit 50.

When the MOSFET Q1 is ON, no energy of the transformer T1 is transferred to the capacitors C7 and C8 because a maximum voltage level, which is about 400V, of the primary side of the transformer T1 is lower than a voltage level, which is about 450V, of the square-wave produced by the MOSFET Q1. But, when the MOSFET Q1 is OFF the capacitors C7 and C8 are charged by the energy transferred from the transformer T1 because the MOSFET Q1 does not hinder the energy transfer from the transformer T1 to the capacitors C7 and C8. The boosted DC voltage charged in the capacitors C7 and C8 are provided as a voltage source of the lamp driver circuit 50.

A large current flows through the transformer T1 when the lamp 60 is started, and if the large current as it is enters into the MOSFET Q1, the MOSFET Q1 may be damaged. Considering this point, the diode D2 provides a path for the energy transfer from the transformer T1 to the capacitors C7 and C8 during a normal operation mode, but the diode D1 provides the path during a start operation mode.

The resistors R1 and R2, when a main switch (not shown) is turned off, prevent devices from being damaged due to remaining charges of the capacitors C7 and C8 by discharging the remaining charges. Each of the resistors R1, R3 and R4 functions as a sensing resistor to detect values of voltage and current fed to the lamp driver circuit 50 by the power-factor correction circuit 40.

Meanwhile, in an operation of the power-factor correction IC 42, the present invention takes a skill of adjusting a supplying time of the source voltage Vcc for the IC chip IC1 by varying device values of the resistor R9 and the capacitor C11. An interval of the supplying time should be within a relight time of the lamp 60. When the lamp 60 is not lighted, the current flowing through the transformer T1 is not large. As a result, an induced voltage at the secondary coil winding T1-2 of the transformer T1 is not enough for charging the capacitor C11 over the driving voltage of the IC chip IC1 and the IC chip IC1 can not receive the source voltage Vcc necessary for a normal operation thereof, so that the switching oscillation of the MOSFET Q1 can not be kept on. As the charge voltage of the capacitor C11 increases, one time of switching operation of the MOSFET Q1 occurs. At this time, if the lamp 60 is not lighted, the switching oscillation does not proceed. But, if the lamp 60 is successfully lighted, a large amount of current flows the transformer T1 so that a great magnitude of voltage is induced at the secondary side of the transformer T1 and thus the IC chip IC1 can be continuously supplied with the source voltage Vcc sufficiently. As a result, the MOSFET Q1 can maintain the switching oscillation. To start the lamp 60, a high-frequency pulse stream of a high voltage should be provided to the lamp 60. But, a continuous supply of the pulse stream may cause a device breakdown. Accordingly, intermittent oscillations are tried until the lamp 60 is lighted so that circuit devices can be protected. Besides, it is possible to normally light the lamp 60 even in a situation that a relight time is changed due to a variation of ambient conditions.

In the full-wave rectifier circuit 30 with the capacitor C6, a transient time during which no current flows may exist. At that time, the power-factor correction circuit 40 has the MOSFET Q1, a switching device, turned on so as to make the transformer T1 provide a continuous current flow by means of a stored energy at the primary coil winding T1-1 when a load needs a current supply, and thereby a power-factor can be corrected and a maximum amplitude of a current supplied from the power source can be reduced. Since the rectifier circuit 30 made of the bridge diode DB1 and the capacitor C6 can flow a current only when a voltage level of the capacitor C6 is lower than that of the rectified voltage by the bridge diode DB1, the less a ripple of the DC voltage is, the shorter a time during which a current flows is and thus the power-factor becomes poor. But in an occasion that the rectifier circuit 30 is employed together with the booster type power-factor correction circuit 40, a current can be flown by the MOSFET Q1 when no current flows in the load, and at this time the energy can be stored in the coil winding of the transformer T1. When there is a need of supplying the current to the load, the stored energy is supplied to the load together with a current which is directly supplied from the power source Ai. Accordingly, using the power-factor correction circuit 40 can ensure a continuous supply of the current to the load and thus the power-factor can be improved.

The lamp driver circuit 50 plays a role to transfer the boosted DC voltage fed from the power-factor correction circuit 40 to the lamp 60 in a way of half-bridge so as to drive the lamp 60. Particularly, transformers T4-1/T4-2 and T4-3/T4-4 are added to the transistors Q2 and Q3 which are connected in the way of half-bridge, respectively, in order to enhance the amounts of the base currents of the transistors Q2 and Q3. The lamp 60 can be sufficiently driven by means of the enhanced base currents even if the lamp 60 has a high-wattage.

Figure 5E:
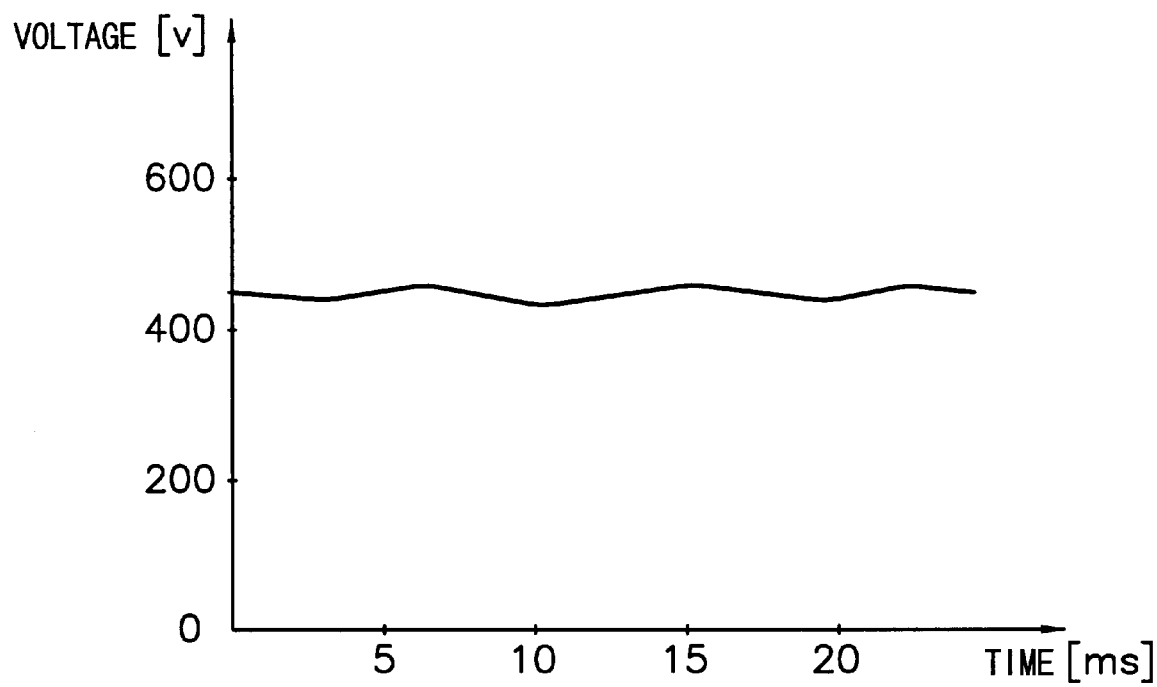

The capacitors C19 and C20 of the lamp driver circuit 50 are charged with charge energies of the capacitors C7 and C8 which are transferred through the output terminal e of the power-factor correction circuit 40. The voltage developed at the output terminal e has a value of about 450V~470V and consists of a DC component mainly with a little sinusoidal ripple component. FIG. 5E shows a waveform of the voltage.

The charge voltage of the capacitor C19 is discharged through a loop formed by the transistor Q2, the filter section 56 and the lamp driving section 58 when switching transistor Q2 is turned on. Likewise, the charge voltage of the capacitor C22 is also discharged through a loop formed by the transistor Q3, the filter section 56 and the lamp driving section 58 when switching transistor Q2 is turned on. While the voltage levels of the capacitors C19 and C20 are lowered due to the discharge, the capacitors C7 and C8 provide their energies so as to recharge the capacitors C19 and C20. As such, the capacitors C19 and C20 periodically repeat the charge and discharge in response to the ON/OFF switching operations of the transistors Q2 and Q3, and through the charge and discharge operation, the lamp driving section 58 provides a driving power to the lamp 60 with generating an RLC resonance.

Figure 5F:
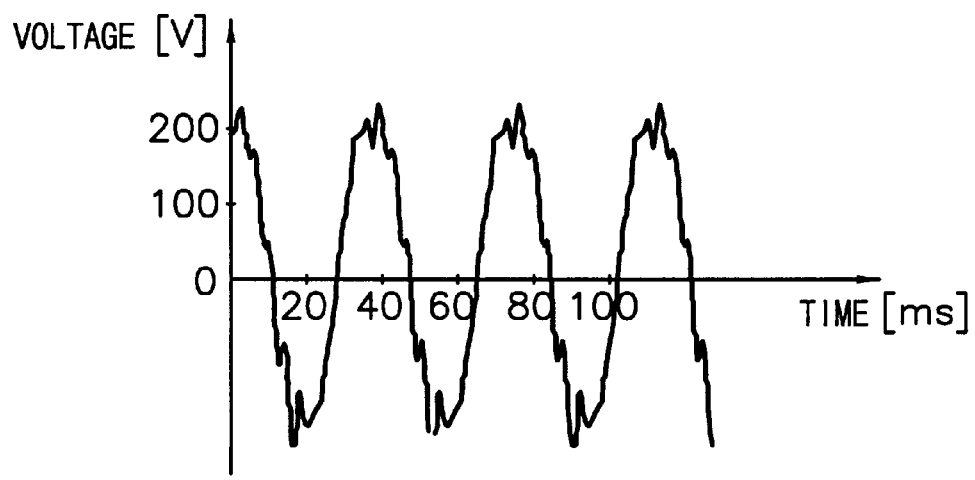
Figure 5G:
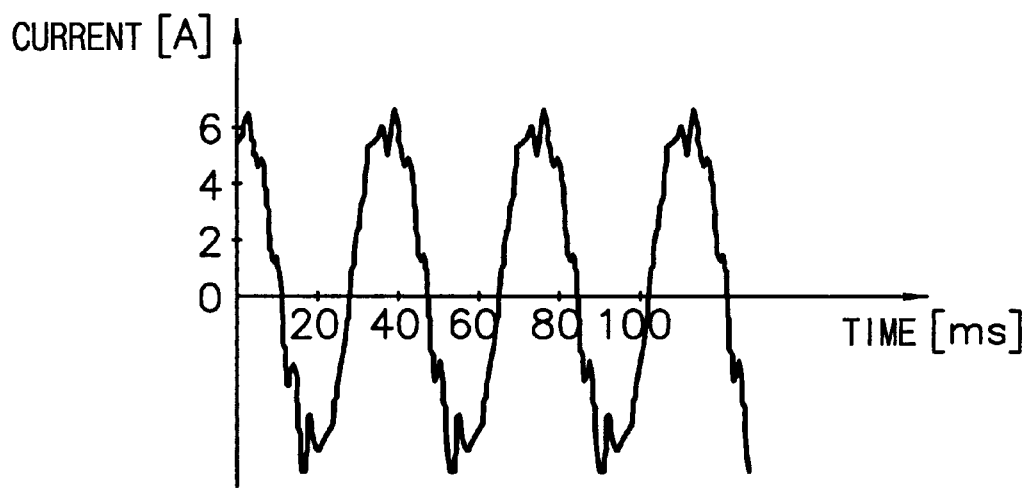
Figure 5H:
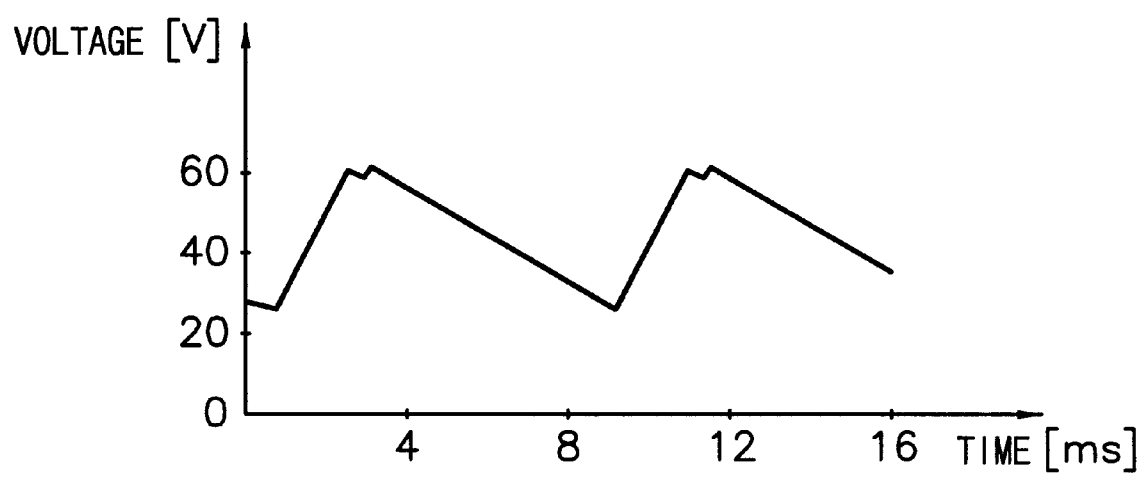

A detailed explanation for this is as follows. The transistors Q2 and Q3 repeat the ON/OFF switching operations alternately. At first, the transistor Q3 is turned on. In order to turn on the transistor Q3, a base current should be provided to the transistor Q3. A source of the initial base current is a voltage induced at the secondary coil winding T1-3 of the transformer T1. The induction voltage of the secondary coil winding T1-3 charges the capacitor C25 via the diode D20, and then the charges stored in the capacitor C25 charge the capacitor C22 with being periodically discharged via the resistor R24 according to the voltage level variation of the capacitor C22. FIG. 5H depicts a voltage waveform captured at a connection of the diode D20 and the capacitor C25. The level of the charge voltage of the capacitor C22 increases in a form of sawtooth wave according to a time, and when the level reaches a conductive voltage of the DIAC D16, the capacitor C22 can provide the base current to the base of the transistor Q3 to turn on the transistor Q3. Due to the provision of the base current to the transistor Q3, the voltage level of the transistor Q3 is lowered again. The transistor Q3 maintains the ON status while the voltage level of the capacitor C22 exceeds the conductive voltage of the DIAC D16. The DIAC D16 operates once at the start operation. After the main switch is turned off, the capacitor C22 is charged and then the DIAC D16 is turned on, so that the switching transistor Q3 can initiate its operation. Once the switching transistors Q2 and Q3 begin their operations, operation frequencies of them are kept very high. Thus, the switching transistors Q2 and Q3 maintain their operations before the voltage of the capacitor C22 reaches the conductive voltage of the DIAC D16 and the voltage of the capacitor C22 has a varying value within a range from about 0V to the conductive voltage of the DIAC D16. If the base current is no more provided to the switching transistor Q3 due to a voltage drop of the capacitor C22, the switching transistor Q3 is turned to an OFF-status from an ON-status. In the turn-off of the switching transistor Q3, remaining charges of the base terminal are dissipated in a very short time and thus a turn-off time of the switching transistor Q3 is reduced. The diode D10 plays a role of a free-whirling diode which flows a counter current discharged by a stored energy of the coil windings T2-2 and T4-3.

During the turn-on status of the switching transistor Q3, as mentioned above, the stored charges of the capacitor C20 flows into the collector of the switching terminal Q3 via the coil windings T5-2 and T5'-2, the secondary coil winding T2-2 of the transformer T2 and the coli winding T4-3 of the transformer T4 in turn. In this process, an induction voltage is induced at the coil windings T5-1 and T5-2 of the transformer T5 and the lamp 60 can receive a driving energy. Besides, when a current flows abruptly into the coil winding T4-3 of the transformer T4, an induction current is produced at the coil winding T4-4 which has a mutual coupling with the coil winding T4-3. A portion of the induction current is provided to the base terminal of the switching transistor Q3 via the resistor R27 for limiting a current and the diode D13, and another portion of the induction current is provided to the collector terminal of the transistor Q3 with bypassing through the diode D14. At the same time, an induction voltage is induced at the coil winding T4-4, and by means of the induction voltage, an additional base current is provided to the base terminal of the transistor Q3 via the coil windings T3-2 and T3'-2 of the transistor T3. The increase of the base current causes subsequently an increase of the collector current amount in the switching transistor Q3, which results in a magnification of the driving power which transferred to the lamp 60 through the transformer T5.

Meanwhile, the switching operation of the second switching section 54 is as follows. An abrupt decrease of the base current of the switching transistor Q3 causes the switching transistor Q3 to be turned off and an abrupt decrease of the current of the coil windings T3-2 and T3'-2 of the transformer T3. As a result, an induction current is induced at the other coil windings T3-1 and T3'-1 of the transformer T3. A portion of the induction current is provided to the base terminal of the switching transistor Q2 via the resistor R25 for limiting a current and the diode D18, and another portion of the induction current is provided to the collector terminal of the transistor Q2 with bypassing through the diode D11. At the same time, an induction voltage is induced at the coil winding T4-1, and this induction provides a base current to the base terminal of the transistor Q2 via the resistor R26. By means of the base current, the switching transistor Q2 is turned on, and during the turn-on of the switching transistor Q2, the stored charges of the capacitor C19, as mentioned above, is discharged through a loop formed with the switching transistor Q2, the coil winding T4-2 of the transformer T4, the coil winding T2-2 of the transformer T2 and coil windings T5-2 and T5'-2 of the transformer T5. The diode D9 plays a role of a free-whirling diode which flows a counter current discharged by a stored energy of the coil windings T2-1 and T4-2 when the switching transistor Q2 is turned off. In this process, the lamp 60 can also receive the driving power from the transformer T5.

In the second switching section 54 as the first switching section 52, the abrupt inflow of the emitter current of the switching transistor Q2 into the coil winding T4-2 of the transformer T4 causes an induction voltage at the coil winding T4-1 which has a mutual coupling with the coil winding T4-2 in the transformer T4. This induction voltage enhances an amount of the base current of the transistor Q2 so that an amount of the collector current of the switching transistor Q2 increases. Consequently, the transformer T5 can provide the lamp 60 with a great driving power.

The provision of the base current to the transistor Q2 is performed in a very short time, and after the time, the base current sharply decreases and the switching transistor 02 is turned off again. Here, since the remaining charges in the base terminal of the switching transistor Q2 are dissipated by the resistor R28 and the diode D15 when the switching transistor Q2 is turned off, a switching-off time of the switching transistor Q2 is reduced. The abrupt decrease of the base current induces an induction voltage at the coil winding T3-4 of the transformer T4, and the induction voltage provides the transformer T3 with the base thereof to turn on the transformer T3.

The filter section 56, which has the transformer T2 and the capacitor C21 connected in parallel with the transformer T2, plays a role of a bandpass filter which selects fundamental components from the currents flowing through the first and second switching sections 52 and 54 and provides the fundamental components to the primary sides of the transformers T3, T5, T3' and T5'. Each of the transformers T3 and T5 has a large value of winding ratio and can produce a high voltage signal with a small current necessary for the lamp 60 from a low voltage with a large current of the primary side of the respective transformer T3 and T5.

As such, the first switching section 52 and the second switching section 54 are connected in the way of half-bridge, so that each of the transistor Q3 of the first switching section 52 and the transistor Q3 of the second switching section 54 executes the switching operations alternately and by means of these alternately switching operations, the charged energies stored in the capacitors C19 and C20 are continuously supplied to the lamp 60 as the driving power. FIGS. 5F and 5G shows waveforms of an input voltage and an input current of the lamp 60 during a normal driving of the lamp 60 after a successful light-on of the lamp 60. As can be known from the waveforms, an RMS value of the input voltage is about 100V and an RMS value of the input current of the input current is about 5A, and each of them has a periodic waveform similar to a sinusoidal waveform. Accordingly, it can be known that a value of the driving power supplied to the lamp 60 becomes about 400 Watts. Here, the value of the driving power, that is, the value 400 Watts is an example. And, it is worthy to be noted that if the base currents of the transistors Q2 and Q3 are enhanced much more by magnifying a capacity of the transformer T4, the value of the driving power can be a value larger than 400 Watts.

Here, a polarity of the induction voltage induced at the transformer T5 is alternately changed during the half-bridge switching operations of the first and second switching sections 52 and 54, and the capacitor C23 repeats the charge and discharge periodically so that a power loss of the transformer T5 occurred in the polarity switch of the induction voltage can be reduced and thus a high efficiency in an energy transfer can be obtained. The capacitor C24 limits a driving current fed to the lamp 60 by the transformer T5 so that a current impact due to an over-current which may be provided to the lamp 60 can be reduced.

As described above, the ballast circuit according to the present invention has several advantages as follows. First, the ballast circuit employs the additional transformer T4 for enhancing the base current amounts of the switching transistors Q3 and Q2 of the first and second switching sections 52 and 54 to increase the currents of the switching transistors Q3 and Q2, so that the ballast circuit can drive a discharge lamp of a high-intensity and a high-wattage with the increased currents of the switching transistors Q3 and Q2. Without the additional transformer T4, it is very difficult to increase the currents of the switching transistors Q3 and Q2 and thus it is very hard to configure such an electronic ballast circuit that can drive the HID lamp of which the rating power is more than 200 Watts. But, the ballast circuit of the present invention can drive the HID lamp of which the rating power is more than 400 Watts.

Second, the ballast circuit does not use a particular additional circuit to secure the relighting time so that a configuration of the ballast circuit can be simplified with a low cost.

Third, the ballast circuit is configured so as to utilize such advantageous characteristics of the bipolar transistor as a high withstand voltage and a great current so that the ballast circuit can stably drive the HID lamp of a high rating power.

Fourth, the transformer section which provides the driving power to the HID lamp is configured with a plurality of transformers in parallel in order to drop an operating temperature of the ballast circuit, and thus a life time of the ballast circuit can be extended and operation characteristics of the ballast circuit can be stabilized.

Accordingly, the ballast circuit of the present invention can be applied to the HID lamp of the high rating power and can take an important role in a lamp and ballast market.

While preferred embodiment of the invention has been described, it is understood that the present invention should not be limited to this preferred embodiment, but various changes and modifications can be made by one skilled in the art within the spirit and scope of the invention as hereinafter claimed.

What is claimed is:

1. An electronic ballast for a high-intensity discharge (HID) lamp, comprising:

a power source converting circuit for producing a rectified voltage by rectifying a conventional alternating current (AC) voltage, for providing a start voltage by transforming the rectified voltage, and for converting the rectified voltage into a boosted direct current (DC) voltage whose level is higher than a peak of the rectified voltage and which has a corrected high power-factor by high-frequency switching the rectified voltage; and a high-frequency driving circuit, initiating an operation thereof by the start voltage, for producing a charge voltage by using the boosted DC voltage, for flowing a discharge current due to the charge voltage by alternately executing a high-frequency switching operation, and for providing a driving power to the HID lamp while generating a resonance with an energy transferred by the discharge current, wherein the high-frequency driving circuit comprises a charging section for producing the charge voltage by using the boosted DC voltage; a half-bridge switching section for flowing the discharge current by discharging the charge voltage in a way of half-bridge through a pair of switching devices which are alternately executing the high-frequency switching operation and for enhancing amounts of currents flowing through the pair of the switching devices by transformers provided to each of the switching devices, whereby an amount of the discharge current increases; and a lamp driving section for providing the driving power to the HID lamp while generating the resonance with the energy transferred by the discharge current, wherein the charging section includes first and second capacitors which are connected serially with each other and have an identical capacitance, and wherein the half-bridge section comprises first and second switching sections and a first transformer section connected between the first switching section and the second switching section for providing base driving currents to both first and second switching sections by means of a mutual induction; wherein the first switching section comprises a first bipolar transistor with a grounded emitter that includes a first free-whirling path and provides a discharging path for the first capacitor when the first bipolar transistor is turned on, a start capacitor for charging the start voltage, a DIAC for providing a charge voltage of the start capacitor as a base current of the first bipolar transistor so as to initially turn on the first bipolar transistor, and a second transformer section connected between a collector and a base of the first bipolar transistor for enhancing the base driving current of the first bipolar transistor based on a variation of a collector current of the first bipolar transistor; and wherein the second switching section comprises a second bipolar transistor with a collector connected to the second capacitor that includes a second free-whirling path and provides a discharging path for the second capacitor when the second bipolar transistor is turned on, and a third transformer section connected between an emitter and a base of the second bipolar transistor for enhancing the base driving current of the second bipolar transistor based on a variation of an emitter current of the second bipolar transistor.

2. The electronic ballast as claimed in claim 1, wherein the power source converting circuit comprises a rectifying circuit for producing the rectified voltage by rectifying the conventional AC voltage, and a power-factor correction circuit for charging a capacitor by providing the rectified voltage supplied from the rectifying circuit to the capacitor through a coil, and for charging the capacitor with a stored energy of the coil by a high-frequency switching operation of a switching device arranged between the coil and the capacitor during the rectifying circuit does not provide the rectified voltage to the high-frequency driving circuit directly, so that the capacitor continuously provides the boosted DC voltage to the high-frequency driving circuit to obtain the corrected high power-factor.

3. The electronic ballast as claimed in claim 2, wherein the power source converting circuit further comprises a filter circuit, arranged prior to the rectifying circuit, for filtering a noise of the conventional AC voltage.

4. The electronic ballast as claimed in claim 2, wherein the power-factor correction circuit comprises a transformer for receiving the rectified voltage fed from the rectifying circuit and for transforming the rectified voltage; a start voltage supplying section for providing the high-frequency driving circuit with the start voltage which is obtained by charging an induction voltage induced across a secondary side of the transformer; a charging section for producing a charge voltage by using the rectified voltage transferred through a primary side coil winding and by using an energy stored in the primary side coil winding of the transformer; a switching section, arranged between the primary side coil winding and the charging section for executing the high-frequency switching operation in response to a switching control signal, and for transferring the energy stored in the primary side coil winding of the transformer to the charging section so as to maintain a voltage level of the charging section higher than a level of the rectified voltage while the rectifying circuit does not transfer the rectified voltage to the high-frequency driving circuit by the high-frequency switching operation; and a power-factor correction section for providing the switching control signal whose frequency is adjusted for maintaining a high power-factor to the switching section so that the boosted DC voltage of the charging section can be continuously provided to the high-frequency driving circuit.

5. The electronic ballast as claimed in claim 1, wherein the rectified voltage is obtained from a full-wave rectification of the conventional AC voltage.

6. The electronic ballast as claimed in claim 1, wherein each of the switching devices is a bipolar transistor.

7. The electronic ballast as claimed in claim 6, wherein each of the transformers induces an induction current by using a conduction current of each of the switching devices which varies at a high frequency and provides the induction current as a base current to each base terminal of the switching devices.

8. The electronic ballast as claimed in claim 1, wherein the high-frequency driving circuit further comprises a filter section for selecting a fundamental frequency component from the discharge current which flows through the half-bridge switching section so as to provide the selected fundamental component to the lamp driving section.

9. The electronic ballast as claimed in claim 1, wherein the first transformer section includes a plurality of transformers having a parallel connection with each other.

10. The electronic ballast as claimed in claim 1, wherein the lamp driving section comprises a driving transformer section, connected between a connection of the first and second capacitors and the half-bridge switching section, for transforming the discharge current of the half-bridge switching section into a driving power for the HID lamp; a third capacitor, connected to the driving transformer section in parallel, for reducing an energy loss caused by an alternate polarity switching of an induction voltage of the driving transformer; and a fourth capacitor for limiting an overcurrent of the HID lamp.

11. The electronic ballast as claimed in claim 10, wherein the driving transformer section includes a plurality of transformers having a parallel connection with each other.

12. An electronic ballast for a high-intensity discharge (HID) lamp, comprising:

a power source converting circuit for producing a rectified voltage by rectifying a conventional alternating current (AC) voltage, for providing a start voltage by transforming the rectified voltage, and for converting the rectified voltage into a boosted direct current (DC) voltage whose level is higher than a peak of the rectified voltage and which has a corrected high power-factor by high-frequency switching the rectified voltage; and a high-frequency driving circuit, initiating an operation thereof by the start voltage, for producing a charge voltage by using the boosted DC voltage, for flowing a discharge current due to the charge voltage by alternately executing a high-frequency switching operation, and for providing a driving power to the HID lamp while generating a resonance with an energy transferred by the discharge current, wherein the high-frequency driving circuit comprises a charging section for producing the charge voltage by using the boosted DC voltage; a half-bridge switching section for flowing the discharge current by discharging the charge voltage in a way of a half-bridge through a pair of bipolar transistor switching devices which are alternately executing the high-frequency switching operation and for enhancing amounts of currents flowing through the pair of the switching devices by transformers provided to each of the switching devices, whereby an amount of the discharge current increases.

* * * * *